CYRUS LAWTON SABIN, OF BARNARD, VERMONT.

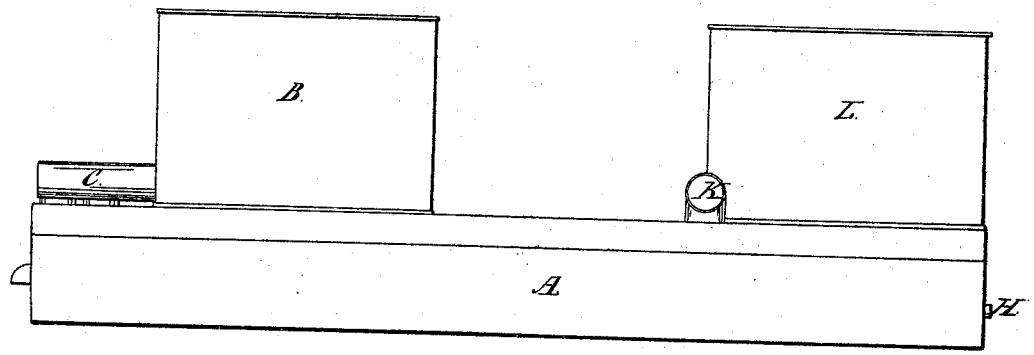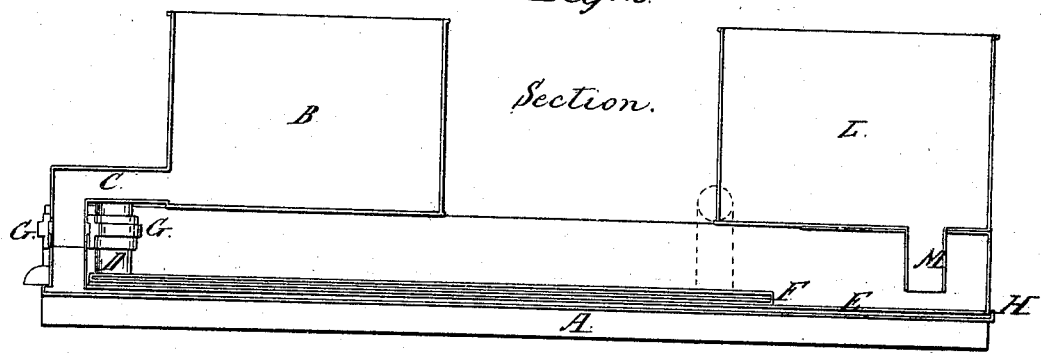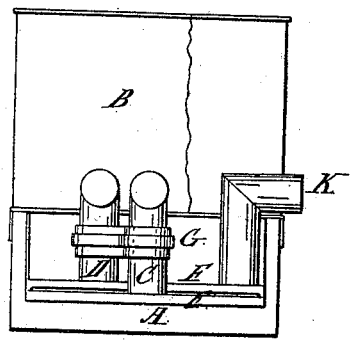

Letters Patent No. 88,332, dated March 30, 1869.

IMPROVEMENT IN MILK-COOLERS.

The Schedule referred to in these Letters Patent and making part of the same.

*To all whom it may concern:*

Be it known that I, CYRUS LAWTON SABIN, of the town of Barnard, in the county of Windsor, and State of Vermont, at present residing in the town of Woodstock, county of Oxford, and Province of Ontario, have invented a new and useful Machine for Cooling Milk or other Liquids, to be known as "Sabin's Milk-Cooler and Deodorizer;" and I do hereby declare that the following is a full, clear, and exact description of the construction and operation of the same, reference being had to the annexed drawings, making a part of this specification, in which—

Figure 1 is a longitudinal elevation;

Figure 2, a longitudinal section; and

Figure 3, an end elevation.

Similar letters of reference in the several figures represent the same parts of the machine.

A represents the frame of the machine, which is composed of wood, and lined with tin on the inside.

B, the cold-water-feed box, from which the water passes, through the pipes C D, into the conductors E F.

These pipes are in two pieces, one half being attached to the feed-box, and the other half, to the conductors, being connected together by a flange and screw, at G, by which means the conductor, or conductors can be easily removed and cleaned.

These conductors E F are made of tin, about one-fourth of an inch in depth, and of the same width as the frame, or trough.

The upper conductor, F, has a flange underneath, on each side, about one-fourth of an inch deep, resting on the lower conductor, E, so as to allow the milk to flow between them.

The lower conductor, E, extends the whole length of the machine, and projects slightly over the end of the frame, to allow the milk to flow over freely. The upper conductor, F, is shorter.

The water in the lower conductor escapes from an aperture at the opposite end, at H.

The water in the upper conductor flows from the pipe K.

The hopper, L, receives the milk, from which it passes through the pipe M, and flows along the whole length of the machine, through the space between the two cold-water conductors, falling over the further edge of the lower conductor, E, in a thin, broad sheet, and in a perfectly cool state, into the vessel placed to receive it.

The length and width of cooler may be changed, to suit circumstances. The number of water-conductors may also be increased, as occasion requires.

I do not broadly claim cooling milk by a current of water running in a direction opposite to the milk-current, as I am aware that that has already been accomplished, but limit the claim to the devices for effecting the result.

What I claim as my invention, and desire to secure by Letters Patent, is—

The combination and arrangement of water-tank B, with pipes C and D, the milk-receptacle L, with pipe M, and the broad, flat water-channels, above and below a similar channel for the milk, all substantially as and for the purpose set forth.

C. L. SABIN.

Witnesses:
A. BURROWES,
CHS. L. BEARD.